United States Patent [19]

Imanidis et al.

[11] Patent Number: 4,895,733
[45] Date of Patent: Jan. 23, 1990

[54] METHOD AND SYSTEM FOR AGGLOMERATING PARTICLES AND/OR FOR COATING PARTICLES

[75] Inventors: Georgios Imanidis, Serres, Greece; Hans Leuenberger, Pfeffingen, Switzerland; Reinhard Nowak, Binzen, Fed. Rep. of Germany; Jürg M. Studer, Muri; Stefan Winzap, Reinach, both of Switzerland

[73] Assignee: Pharmatronic AG, Pratteln, Switzerland

[21] Appl. No.: 194,988

[22] PCT Filed: Sep. 8, 1987

[86] PCT No.: PCT/CH87/00114
§ 371 Date: May 5, 1988
§ 102(e) Date: May 5, 1988

[87] PCT Pub. No.: WO88/01904
PCT Pub. Date: Mar. 24, 1988

[30] Foreign Application Priority Data
Sep. 9, 1986 [CH] Switzerland .................. 3610/86

[51] Int. Cl.$^4$ .................. B05D 17/00; B05D 7/00; B05C 5/00; B05C 11/00
[52] U.S. Cl. .................. 427/8; 118/303; 118/712; 118/DIG. 5; 427/213
[58] Field of Search .................. 118/303, 712, DIG. 5; 427/8, 213

[56] References Cited
U.S. PATENT DOCUMENTS 4,323,312 4/1982 Glatt et al. .................. 366/102
4,344,747 8/1982 Henry .................. 425/140
4,644,665 2/1987 Naunapper et al. .................. 427/213 X

FOREIGN PATENT DOCUMENTS 3424842 9/1985 Fed. Rep. of Germany .
1401304 7/1975 United Kingdom .

OTHER PUBLICATIONS

"Monitoring Granulation", H. Leuenberger, Manufacturing Chemist, Jun. 1984, pp. 53, 55.
Bericht uber das 4, Interdisziplinare Symposium Agglomeration, Toronto/Kanada of Jun. 2–5, 1985, Swiss Pharma, 7, 1985, pp. 13, 14, 16, 17.
"Determination of the Uncritical Quantity of Liquid by Power Measurements on Planetary Mixers", H. P. Bier, H. Leunberger and H. Sucker, Pharm. Ind. 41, No. 4, 1979, pp. 375–380.
"Granulation, New Techniques", H. Leuenberger, Pharm. Acta Helv., 1982, No. 3, pp. 72–82.
"Monitoring Granulation", H. Leuenberger, Manufacturing Chemist, May 1984, pp. 67, 69, 71.

Primary Examiner—Michael Lusignan
Attorney, Agent, or Firm—Fleit, Jacobson, Cohn, Price, Holman & Stern

[57] ABSTRACT

A vessel (1) contains a rotor disc (23) mounted for rotation around a vertical axis (17) and arranged to bound a processing space (31) disposed above it. The agglomeration and/or the coating of particles are accomplished by moving the particles by the rotation of the rotor disc (23) and by means of a gas, in particular air, passed upwardly through the processing space (31) and by spraying them with a liquid. The torque required for the rotation of the rotor disc (23) is continuously measured by means of a torque measuring member (75) disposed between the rotor disc (23) and the drive device (77) arranged to drive the same. The agglomeration and/or the coating operation is controlled on the basis of the time-dependent variation of the torque and/or of the first derivative of the same, and/or of a variable having relation to the torque and/or its derivative. In this way, agglomerated particles and/or particles provided with a coat may be produced, the particles possessing relatively accurately prescribed properties, such as for example particle sizes lying within a prescribed range.

29 Claims, 4 Drawing Sheets

METHOD AND SYSTEM FOR AGGLOMERATING PARTICLES AND/OR FOR COATING PARTICLES

TECHNICAL FIELD OF THE INVENTION

The invention refers to a method for agglomerating particles and/or for coating particles, in particular for coating particles with other particles, in which method the particles are moved by the rotation of a rotor disc.

The invention furthermore refers to a system for agglomerating particles and/or for coating particles, in particular for coating them with other particles, the system comprising a vessel, a rotor disc rotatably supported within the vessel for moving the particles, and a drive device operatively connected, for rotation, with the rotor disc and serving for rotating the same.

Methods and systems of this kind may be used, for example, for producing particulate drugs or components of drugs, furthermore of nutrients, agricultural and other chemicals, seed pellets, as well as metallic granules subjected subsequent to their granulation to an additional sintering process, for producing catalytic materials.

THE STATE OF THE ART

U.S. Pat. No. 4,323,312 discloses fluidized bed granulators comprising a vessel having a vertical central axis, a rotor disc supported for rotary movement around said axis, a drive device to rotate the rotor disc and a blower. The agglomeration of a particulate material in a system of this kind is accomplished by moving the particles within a processing space disposed above the disc, by the rotation of the disc and by passing air therethrough. During the process, the particles momentarily on the disc are caused to roll outwardly, toward the edge of the disc, here they are lifted upward by the air stream and are caused to drop back onto the disc.

In actual practice, the particulate material is often introduced into the vessel in dry form and is humidified in the same by a liquid containing water, the liquid being sprayed into the vessel by means of a spraying nozzle not disclosed in U.S. Pat. No. 4,323,312. The particles generated by agglomeration during the supply of the liquid are subsequently allowed to dry in the processing space, while no liquid is supplied. Various properties of the particles generated by granulation, in particular their geometrical and mechanical properties, as their shapes and mean sizes, the standard deviations of the particle sizes and their porosity, as well as the abrasive resistance of the particles, are dependent primarily on the liquid content of the particles during the termination phase of the granulation process, but also on other parameters of the method. When agglomerating a batch of a particulate material, for example, in the beginning only initially provided particles can become deposited on each other, and on particles previously agglomerated. If now the total quantity of liquid supplied exceeds a specific value, then relatively large particles previously agglomerated can also become deposited on each other, so that twin particles or triplets, etc. can form, the particle shapes become very irregular and the particle sizes increase rapidly ad discontinuously. The liquid content of the particles evidently depends upon the quantity of the sprayed or injected liquid per unit mass of dry particulate material, but also upon the humidity of the air introduced into the vessel, and upon the quantity of liquid removed by this air from the particulate material in the form of steam and/or suspended droplets. If the air introduced into the vessel is drawn, at least in part, from the surroundings, then its humidity content may vary depending upon the humidity content of the surrounding air, and influence the properties of the product. Therefore, particularly if granulated materials are industrially produced and if sizeable batches of such materials are produced repetitively, it is frequently not perfectly possible to produce granulated particles having desired properties, as for example spherical shapes and uniform sizes, by preference. It is equally known in the field, to condition he air supplied to the vessel prior to its being introduced thereinto, i.e. to bring it to a predetermined small remaining humidity content. However, this requires more elaborate apparatus and increases the operational costs, and has the primary disadvantage, that the quantities of liquid and the particle properties dependent upon them can, nevertheless, deviate from the desired values which were aimed at. This may be explained by the fact, that the quantities of liquid required for the granulation of batches of a particulate material are also dependent upon the grain sizes of the initial, dry, particulate material, which frequently vary in actual practice, even with essentially identical types of materials, as well as upon the quantities of liquid carried away by the air from the processing space of the vessel, and are also known to frequently also vary slightly from batch to batch—in actual practice—even if the material quantities and types are identical.

If granulated products are to be made for pharmaceutical applications, the aim is to produce granulated parts of roundly, preferably spherical shape. With various products of this type these aims can be achieved by means of the known methods more or less successfully, only if sugar particles are added to the particulate material to be agglomerated, to serve as so called seeds, on which the particles containing the pharmaceutical effective substance can become deposited. However, it is inconvenient, in many cases, to have the particles produced contain sugar, because then, assuming for example a predetermined particle size, the quantity of effective substance per particle will only be relatively small.

Problems similar to those arising when producing granulated particles are encountered, if particles formed by agglomeration or particles freshly fed into a processing space are to be provided—by a process including humidification—with at least one different coat, containing in general particles of considerably smaller size. If, namely, the quantity of liquid supplied becomes for example too large, the case may arise, that the large particles to be agglomerated, or the particles already provided with coats of greater or lesser thicknesses, may undesirably agglomerate.

DESCRIPTION OF THE INVENTION

The invention is to solve the problem of creating a method and a system capable of avoiding the disadvantages of the known methods and systems and suited in particular for producing granulated particles, or particles provided with at least one coat, for example a coat containing particles, the particles produced to preferably have accurately predetermined properties, as for example roundly, by preference spherical shapes and/or prescribed mean particle sizes, standard deviations of such particle sizes, as well as bonding strength and abrasive resistance.

This problem is solved by means of a method characterized in that at least one variable related to the torque and/or to the power required for rotating the rotor disc is measured, and the process is controlled in dependence of this measured variable.

As part of the solution to the problem, there is provided a system of the aforementioned kind characterized, according to the invention, by a measuring member for measuring a variable related to the torque and/or the power required for rotating the rotor disc.

The method and the system according to the invention provide for the possibility of producing particles, which possess relatively accurately specified properties, in particular geometrical and mechanical properties, even if the production quantities are subdivided into several batches, so that, for example, the particle shapes at least closely resemble a predescribed shape. The method and the system are particularly suited for producing roundly, and at least to a certain extent symmetrical particles, for example at least approximately ellipsoid shapes or ball-shaped particles, known in the pharmaceutical word as "pellets".

The method and the system may serve the purpose, for example, to perform within a processing space, serving for moving and processing particles, the agglomeration of particles of more or less similar sizes and all consisting of the same or of different substances, and to thus connect them to larger size particles. As will yet be explained, the agglomeration is normally accomplished by spraying or injecting a liquid, in particular a bonding and/or a humidifying medium. The method and the system according to the invention are also well suited, in particular, for agglomerating, for pharmaceutical purposes, a particulate material not containing any seed-particles of sugar, but only particles that do not contain any substance not wanted in the final product, all such particles to have, for example, at least approximately the same size. The initially provided particles may contain, for example, at least one pharmaceutical effective substance as well as, in general, at least one auxiliary substance and/or possibly a bonding substance.

The initial material may, however, be newly introduced particles or particles previously agglomerated within the processing space serving for moving and processing particles, and be moved, namely whirled, therein, or provided with at least one coat, whereby the method may be controlled, according to the invention, in dependence of the measured torque and/or of a variable related thereto. The coating material by preference consists in this case, at least in part, of two particles. The sizes of the second particles to serve for forming a coat are, by preference, approximately or at least ten times, or even approximately or at least one hundred times smaller than the sizes of the first mentioned particles, which the coat is applied to. The first, larger sized particles could possibly have sizes, such as mean diameters between at least 0.4 mm and at most 1 mm, for example between 0.4 and 0.5 mm; and the second particles, to be applied as coating material to the first particles could have sizes ranging from 0.01 to 0.03 mm. The first, larger particles, and the second, smaller particles to be applied as coating material to the larger particles, may be introduced into the processing space in the form of batches of dry particles, for example as mixtures. However, the second particles serving to form coats may, instead be introduced, or at least in part, during the movement, i.e. the whirling, of the first particles intended to be coated continuously or intermittently, into the processing space. The second, smaller particles may then be applied as coating material to the larger particles by the movement, i.e. the whirling, of the particulate material containing said first and said second particles, and by spraying a liquid that contains a bonding medium and/or a humidifying medium. The particles to be applied as coating material may however be conceivably suspended in a liquid and, together with the latter, be sprayed as suspension into the processing space, not before the movement of the particles to be coated is already in progress. The coating material could consist, however, of nothing but a lacquer, for example a solution, or of another substance containing no particles of any kind.

If particles are to be produced for pharmaceutical purposes, the first, initially larger sized particles may perhaps comprise at least one pharmaceutical effective substance, generally at least one auxiliary substance and perhaps a bonding medium, whereas the second, smaller-sized particles, to form the coating material, may consist of a different effective substance and/or a protective and/or auxiliary substance, such as talc, starch, polyethylene glycol, ethyl-cellulose, acrylic acid derivative, etc. It is possible, furthermore, to apply in sequence two or more coats of different substances.

The initially provided dry, particulate material may be so structured, to make each of its particles, when subjected to humidity, exhibit a bonding effect sufficient for obtaining an adhesive bond. The initially supplied, dry particulate material may consist, however, of a mixture of particles, some of which may consist of at least one pharmaceutical effective substance and the other of a bonding medium. In these cases the particles, as they are moved by the rotation of the rotor disc or by the passing of air or perhaps of a different gas, may be agglomerated by spraying the particles with clean water as humidifying medium, for example with water which—in dependence of the desired product purity—has been demineralized or distilled before, or perhaps with an organic liquid such as ethyl alcohol or some other organic solvent.

If the particles of the initially provided dry material fail to yield satisfactory bonding by simple humidification with water or with an organic liquid, then a liquid comprising a bonding medium may be sprayed during the agglomeration and/or coating operation. The bonding medium may be constituted for example by a liquid component of the sprayed liquid, by a solid material dissolved in water or in another solvent, or by a solid material suspended in the liquid. As another possibility, the particulate material may be sprayed with wax, which is solid at normal room temperature and melts when heated.

It may even be possible, to heat in the vessel a more or less wax-like particulate material, for example to such an extent, as to make the initially provided particles become softened, at least on their outer surface, and agglomerated without spraying any liquid and without supplying any additional bonding medium.

During the agglomeration and/or coating operation, the torque transmitted from the drive device to the rotor disc may be determined, with the purpose of determining—on the basis of the torque—the duration of the agglomeration and/or coating operation and/or the quantitiy of liquid to be supplied. The drive device preferably comprises an electrical motor and a transmission unit for the stepless or perhaps stepwise change of the rotational speed of the rotor disc. If a transmission unit of this kind is provided, then the torque is determined to advantage by means of a torque measuring member disposed in the path of torque transmission between the drive shaft of said transmission unit and the rotor disc, so that any losses caused by said transmission unit by the transmission of the torque will have no influence upon the measurement.

The power required for the rotation of the disc is equal to the torque multiple by the angular velocity, and is thus proportional to the torque. Therefore, instead of determining the torque, it is possible to determine a value related to the torque, namely the power required for driving the rotor disc, by measuring for example the electrical power consumed by the motor of the drive device. However, since this value of power is greater than the power required by the rotor disc for moving the particulate material, because of the power losses in the motor and in the preferably provided transmission unit for adjustably changing the rotational speed, and since these power losses may vary in time, depending on the temperature of the motor and/or of said transmission unit, it is of advantage to directly measure the torque transmitted, to the rotor disc, by means of a torque measuring member, in the aforementioned manner, rather than measure the power consumed by the motor.

Investigations have shown that the dependence of the torque required for the rotation of the rotor disc upon the time duration of the agglomeration and/or coating operation, and upon the quantity of liquid supplied during the latter operation, displays characteristic features, which may be associated with specific phases of the agglomeration and/or coating phenomena for various particulate materials. This offers the possibility to perform and to control the agglomeration and/or the coating in a way, that certain variable properties of the initially provided particulate material, for example its particle sizes, or certain variable method parameters, such as the humidity of the air introduced into the processing space of the vessel, will not or only relatively slightly influence the properties important in regard to the quality of the produced products, i.e. of the formed particles and in particular pellets. The insensitivity of the supplied air against humidity changes makes it possible, in turn, to provide the processing space, at least in general, with air from the surroundings, without having to adjust its humidity by any special measures, such as by drying, to a preset value, or to fit it into a range of values.

If the agglomeration or the coating of particles is accomplished by spraying a liquid into the processing space, at least at times, as is the case in the majority of applications, then the spraying operation can be controlled in dependence of the measured torque and/or of a variable related thereto, and can be, when agglomerating particles, for example, transiently interrupted at a particular time value and/or ended. If a liquid bonding medium is sprayed into the moved mass, then the spraying operation may each time be ended—or at least interrupted—approximately at a time value lying at the end of a phase of operation, in which, when depositing onto particles already agglomerated, at least in general, only such particles will get deposited as had been initially provided within the particulate material, whereas when coating, only coating material will be deposited. The operational phase would then be followed by another operational phase, in which particles already agglomerated, or provided with a coating, as the case may be, would get deposited on each other. If a particulate material is to be agglomerated by the inclusion of the spraying of a liquid bonding medium, then the process may be so controlled and carried out, that disregarding any possible exceptions, in the initial phase, at least in general, only particles as had been initially provided in the particulate material will undergo deposition, whereas particles already agglomerated will not become connected to form twins or triplets or the like. The agglomerated particles will then obtain comparatively uniform shapes and dimensions. The resulting shapes of the agglomerated particles are dependent, among others on the properties of the particulate material. If the latter possesses sufficient plasticity, the resulting shapes may be roundly, ellipsoid-like or even pretty accurately ball-like.

As mentioned before, it is possible with certain types of particles to agglomerate them and/or provide them with coats, by spraying them with only a humidifying medium, rather than a bonding medium. For example, particles that comprise micro-crystalline cellulose as a carrier or auxiliary substance, may be rendered sufficiently adhesive, by spraying water on them, to enable them to be agglomerated, while the bonding effect comes about by way of hydrogen bonds, at least to a large extent. Particularly if the agglomeration operations are carried out using a sprayed humidifying medium, it could be possible to produce largely spherical and in other respects, too, qualitatively unobjectionable agglomerated particles, even if particles already agglomerated will become mutually connected to form even larger particles, under the condition that the spraying of the humidifying medium is ended at a point in time, at which the torque of the rotor disc fulfills at least a certain criterion.

It is therefore possible to achieve, for example, that particles produced by agglomeration and/or by coating have not only a prescribed shape, at least approximately, in particular a roundly shape, but also sizes that lie at least near a prescribed value, even in a case in which certain properties of the initial materials used, or certain parameters of the process are subject to change from one batch to the next. Particles produced for pharmaceutical applications, for example for introducing them into capsules, could have mean and/or maximum sizes that typically amount to at most 2 mm, preferably at most 1.5 mm and, for example about 0.5 to 1 mm. It is, furthermore, possible to bring various kinds of resistance parameters of the produced particles, for example the abrasive resistance, to assure, at least approximately, prescribed values, and constant from one batch to the next.

The particles produced by agglomeration and/or coated with a coating material may be whirled and dried by means of air or some other gas, within the same processing space in which they were agglomerated, whereby, evidently, no liquid is sprayed into the processing space during the drying operation.

BRIEF DESCRIPTION OF THE DRAWING

The invention shall now be explained with reference to the embodiments shown in the drawing. In the drawing there show.

PREFERRED EMBODIMENTS OF THE INVENTION

Figure 1:
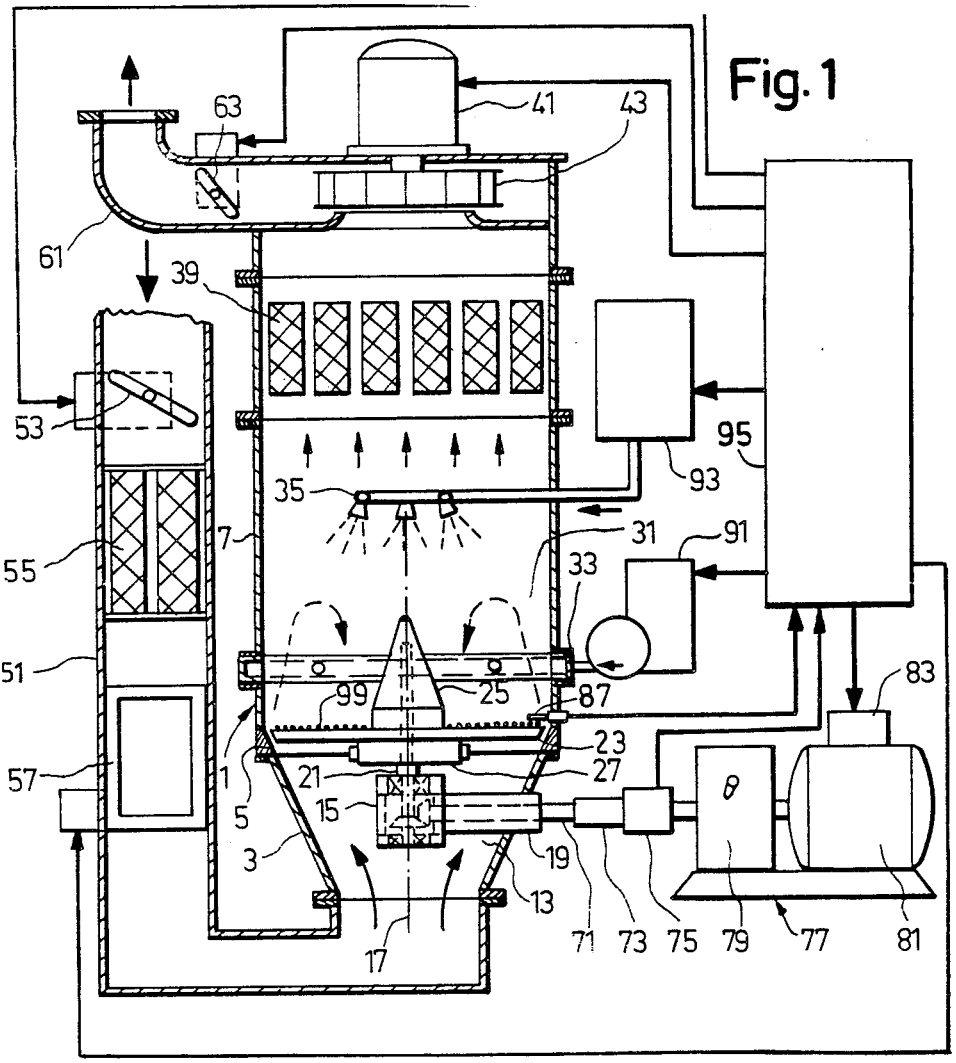
FIG. 1 a schematic vertical section through a system for agglomerating and/or coating particles and FIG. 2 a view corresponding to FIG. 1, of a variant of the system, FIG. 3 a schematic horizontal section through the vessel bounding the processing space of the system shown in FIG. 2, FIG. 4 a diagram for demonstrating the dependence of the torque required for rotating the rotor disc of the system, upon time, and upon the quantity of liquid supplied in the case of an agglomeration operation carried out by the spraying of a liquid bonding medium, and FIG. 5 a diagram corresponding to FIG. 4, for an agglomeration operation, in which the particles are sprayed with a humidifying medium only, rather than with a bonding medium.

The system shown in FIG. 1 and consisting, at least essentially, of a fluidized bed apparatus comprises a vessel 1. The wall thereof comprises at the lower vessel end a conical wall part 3 connected at its upper end by two screw-connected flange rings to an essentially cylindrical flange 7. The upper of the two flange rings possesses a conical inner surface and forms a seat 5. The inner space of the conical wall part 3 constitutes a gas conducting chamber 13 and accommodates a bearing and transmission unit 15 comprising a housing fixedly mounted to the wall part 3 by way of a radial hollow arm 19, and for example by two additional radial arms not shown in the drawing, and comprises bearings, arranged to support a shaft 21 rotatably around and non-displaceably along a vertical axis 7, which coincides with the central axis of the vessel 1. On the shaft 21, above the bearing and transmission unit 15, are held by means of non-visible holding members, a rotor disc 23 and a riser 25, axially displaceably and rotatably in relation to the shaft 21, the riser 25 comprising a hollow conical part implementes as a cap and tapering toward the top. The rotor disc 23 possesses a metallic main part and—fastened to the outer edge thereof—a slip sealing ring, consisting for example of polytetrafluorethylene. The metallic main part of the rotor disc may be provided on its top side, under circumstances, with a cover disc or with a covering sheet, consisting for example of natural and/or synthetic rubber and forming a plurality of knublike bulges distributed over the surface of the rotor disc. The rotor disc 23 is displaceable along the shaft, by means of a setting and entraining device, which may be manually actuated from the outside of the vessel. In the lower end position of the rotor disc 23 the slip sealing ring of the latter rests tight on the seat 5. If the rotor disc 23 is displaced upward, there arises an annular clearance between the disc 23 and the inside surface of the vessel wall, as shown in FIG. 1. The setting and entraining device forms, furthermore, a slipping clutch, which connects the rotor disc 23, more or less torque transmittingly, with the shaft 23, when the rotor disc 23 is in its raised position. If, on the other hand, the rotor disc 23 is in its lower end position, and the parts of the device 27 that are displaceable along the shaft 21 assume their very lowest positions, then the rotor disc 23 will become—at least to a significant extent—uncoupled from the shaft 21.

The free zone of the inner space of the vessel disposed above above the rotor disc 23 constitutes a processing space 31. The cylindrical shell 7 is provided with an inlet member 33 disposed slightly above the rotor disc and serving for introducing a dry particulate material, and comprising a ring with a channel, and with nozzles distributed over the periphery of the shell 7 and opening into the processing space 31. Furthermore, a spraying device 35 is provided, serving for spraying a liquid into the processing space and comprising at least one spraying member, which in turn comprises at least one nozzle and, for example, several nozzles distributed around the vertical central axis of the vessel 1 and disposed above the region of the space occupied during operation by the moved particles, while directed downward, in perpendicular or inclined manner. Above the processing chamber 31 is provided a filter 39, and above the filter 39 a blower 41 comprising a conveying member 43 implemented as a blade impeller.

A gas supply conduit 51 comprises a suction stud, not shown, for drawing surrounding air, a regulating member 53 for regulating the rate of flow, a filter 55, and a gas heater 57, and is connected at the lower end of the conical wall part 3 to the vessel 1. A gas exhaust conduit 61 connected to the outlet of the blower 41 comprises a rate of flow regulating member 63 and an outlet opening into the surroundings. At lest one of the two regulating members 53, 63 for regulating the rate of flow of the gas is preferably provided with an electrically controllable actuating device.

The shaft 21 is in rotational operative connection, by way of a gear train, namely a bevel gear train, disposed in the housing of the bearing and transmission unit 15, with a rigid shaft 71 running through the hollow arm 19 and supported by the same. The rigid shaft 71 is connected, for transmission of torque, with the output end of the shaft of a torque measuring member 75, by way of a but schematically shown cardan shaft 73 provided with clutches. The member 75 comprises a measuring transducer, in turn comprising strain gages connected to a Wheatstone bridge, and adapted to generate during operation an electric measuring signal formed by a voltage proportional to the transmitted torque, from a constant voltage and applied to the bridge. The shaft pivot of the measuring member 75 at the input end, is connected for transmission of torque with the output end of a transmission unit 79 provided with means for the stepless adjustment of the gear ratio and of the rotational speed. The drive shaft of the transmission unit 79 is connected for transmission of torque with the shaft of an electric motor 81, that may be switched on and off by an electrically controllable switching device 83, for example by a relais switch. The transmission unit 79 and the motor unit 81 serve together as drive and device 77.

In the processing chamber is disposed, above the rotor disc 23 and separated by a small gap from the upper boundary surface thereof, at least one humidity measuring member 87, the latter being mounted non-rotatably in relation to the axis 17 and, for example, adjustably in height, on the wall of the vessel 1, namely on the shell 7.

The inlet member 33 is connected with a supply device 91 for supplying a particulate material, the device 91 comprising a reservoir for the material, an electrically drivable and controllable conveying and/or dosing device, such as, for example, a dosing screw which may be switched on and off and which may possibly be controllable, and a blowing device, for blowing the material conveyed by the dosing device by pressurized air or by another gas, through the inlet member 33, into the processing space 31. If the system is so operated, that an underpressure becomes generated relative to the surroundings, then the particulate material may also be sucked in by this underpressure, and conveyed into the processing space.

The or each spraying member is connected with a supply device 93 for supplying a liquid. This device comprises for example a liquid reservoir and an electrically controllable valve and/or a pump that may driven and controlled electrically, and may be provided, in addition, with a flow rate measuring member.

An electronic monitoring, controlling and/or regulating device 95 is, furthermore, provided. This is connected by way of electrical wiring with the blower 41, the gas heater 57, the actuation devices of the regulating members 53, 63, the torque measuring member 75, the switching device 83, the humidity measuring member 87, and the two supply devices 91, 93. The device 95 comprises electronic circuit means for processing the electrical measuring signals supplied to it by the torque measuring member, these circuit means comprising for example operational amplifiers working in analog manner, comparator circuits and the like, and/or an analog to digital converter for converting the measuring signals to digital signals, a digital computer, and memories. The device 95 may possess, furthermore, registering and indicating means, such as for example a recorder and/or a fluorescent screen for displaying at least one curve, and/or analog and/or digital indicating devices and/or a printer for displaying and/or printing out measured values and/or values calculated therefrom. The device 95 also has, in particular, actuating members and electronic circuit means, that make it possible, to carry out the various required controlling and regulating operations, by choice, either manually or automatically, whereby the various components and devices controllable by the device 95 may also be provided, by themselves, with actuating devices adapted for manual actuation, such as switches and adjusting means. The device 95 is provided, furthermore, with setting or data input elements, for inputting predetermined parameters in analog or digital form.

Figure 2:
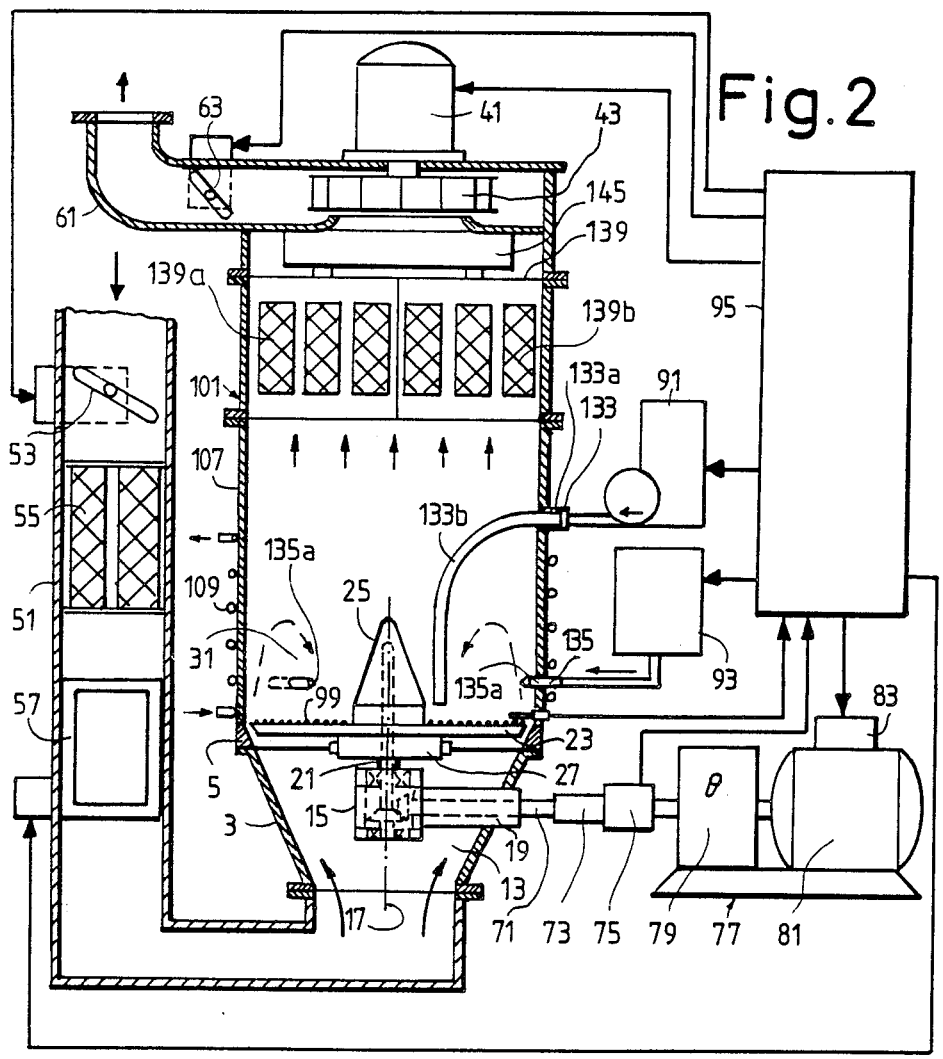

The system visible in FIG. 2 is built largely identical with the system shown in FIG. 1, whereby identical components of the two systems are identified by the same reference numerals. The vessel 101 of the system of FIG. 2 is built largely similar to the vessel 1, it differs, however, from the same, in that its cylindrical sleeve 107 corresponding to the sleeve 7, comprises, at least in its lower zone, in whose inner space the particles are moved during operation, a heating and/or cooling device 109, which in turn comprises a passage for optionally passing a heating or cooling fluid, and is shown schematically as a spiral pipe coil, whereby the shell 107 as well as the heating and/or cooling device 109 may be insulated, evidently, by heat insulation against the surroundings of the vessel. Furthermore, the shell 107 consisting essentially of a metallic material, such as of stainless steel, may comprise at least one window provided with a transparent pane, to enable visual observation of the particles, and/or it may be coated on the inside with a coat of polytetrafluorethylene or of another suitable material effective to counteract the adhesion of the particles, whereby the coat should, by preference, be thin, so as to keep its inhibition of heat transfer within bounds.

The inlet member for a particulate material, as identified by the reference numeral 133 in FIG. 2, comprises a stud serving as connecting piece 133a, the stud being fixedly mounted on the shell 107 above the region of space occupied during operation by the particles and being disposed on the inside thereof, about flush with the inside surface of the shell. A particle guide piece 133b of stable shape, constituted by a piece of pipe and disposed within the processing space 31, is loosenably fastened to the connecting piece 133a and bent downward in such a way, that it opens into the processing chamber near the riser 25, slightly above the rotor disc 23, and, at least in its upper section, is disposed above the region of the space occupied by the particles during operation. The connecting piece 133a is connected with a supply device 91 by way of a loosenable connecting conduit. If a method is used, in which no particulate material must be supplied during agglomeration and/or coating, the guide piece 133b may be removed and/or the connecting piece 133a may be closed off by a loosenably fastenable coverlike or pluglike close-off member.

Figure 3:
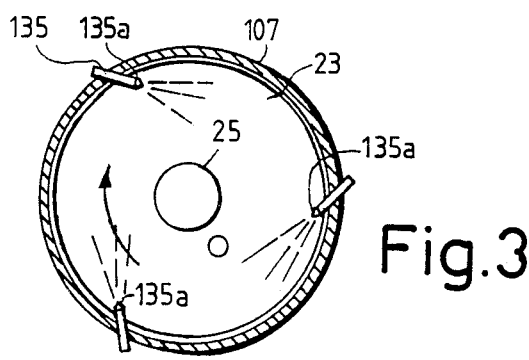

The spraying device 135 of the system visible in FIG. 2 differs from the spraying device 35 of FIG. 1 in that its spraying member comprises at least one nozzle 135a opening into the processing space slightly above the rotor disc 23, so that the exit opening of the nozzle, or the nozzles, is or are disposed during operation in the height range of the moved particles, whereby, for example, several nozzles distributed around the axis of the vessel may be provided. The exit openings of the nozzles 135a are disposed close to the inner surface of the shell 107. The nozzles form an angle with a vertical and are, for example, at least approximately, or accurately, horizontally directed. As is visible in FIG. 3, the nozzles 135a form—in the top view—with the radial lines running through their openings and the axis 17 of the vessel and the rotor disc 23, an angle, whereby the nozzles are so directed, that the liquid pulverized during operation will possess a velocity component parallel to the tangential velocity of the rotor disc 23 that rotates in the direction indicated by an arrow.

The filter 139 is subdivided into two filter sections 139a and 139b held—indirectly—independent of each other. A filter control and filter cleaning device 145 possesses valves connected with the exits of the two filter sections 139a, 139b, with the purpose of selectively connecting the two filter sections, pneumatically, with the gas suction part of the blower 41, or blocking the connection. The device 145 furthermore possesses at least one jolter, for selectively jolting one of the two filter sections.

If by means f one of the systems shown in FIGS. 1 and 2 a batch of agglomerated or granulated particles is to be produced, then the rotor disc 23 is lowered into its lower end position, in which it abuts with its sealing ring on the seat 5 and closes the processing space in downward direction. Furthermore, the lowest part of the vessel, comprising the conical wall portion 3 and a neighboring part of the cylindrical shell, is transiently lowered in the usual manner, by actuating a hydraulic or pneumatic device not shown, and separated from a part of the vessel supported by a frame not shown, then a batch of a predetermined quantity of a dry, particulate material 99 is introduced into the lowest cylindrical part of the vessel and the vessel parts are again reassembled. Furthermore, air is sucked by the blower 41 from the surroundings, through the supply conduit 51 and the vessel 1, and exhausted back into the surroundings by way of the exhaust conduit 61. Then the rotor disc 23 is lifted and rotated by the drive device. For the agglomeration operation the width of the annular clearance between the seat 5 and the rotor disc 23 is normally set to a comparatively small value. The rate of flow is equally set to a comparatively small value, by a corresponding adjustment of at least one of the regulating members 53, 63, whereby, however, the air stream flowing through the annular clearance from below, in upward direction, must at least be sufficient, to prevent a falling off of particles through the annular clearance. Of the particulate material 99, only a few particles, momentarily present on the rotor disc 23 are indicated in FIGS. 1 and 2. These particles roll on the disc outwardly, in consequence of the centrifugal force acting on them, and are thus moved away from the axis 17, the paths they describe being more or less spiral-shaped. As soon as the particles moved by the rotor disc arrive past the edge thereof, they become deflected as well as lifted, by their impact on the vessel wall and by the aforementioned air stream, subsequent to which they again fall back and/or roll downward onto the rotor disc, at the riser 25 or near the same. The lifted particles may form—depending on the preset width of the annular clearance and on the rate of air flow—a bed, compact to some extent, in which neighboring particles come in contact with each other, in general, or else they may possibly become more or less fluidized, at least in places, and may constitute a fluidized bed or a whirling layer, whereby, during the agglomeration operation proper no fluidization, or at most a slight one, is generally required. While the particles are moved in this way within the processing space 31 or 131, a liquid is sprayed by means of the spraying member of the spraying device 35 or 135, into the processing space 31 and onto the particles, so that these will become agglomerated and will form a granulated material. As will be explained in more detail later, a certain additional quantity of the dry, particulate material stored in the supply device may perhaps be introduced—during the final phase of the agglomeration or granulation operation, through the inlet member 33 or 133 into the processing space, namely, it could be metered by means of the dosing screw and blown into the processing space by air or by another gas, or it could be sucked into the processing space by any subatmospheric pressure, if such is prevailing therein.

The drying is accomplished by moving the granulated particles within the processing space 31 by the rotation of the rotor disc and by the air passed therethrough, whereby, of course, no additional liquid is sprayed anymore into the processing chamber. Furthermore, the sucked air is heated by the gas heater 57—at least for the drying operation before its entry into the processing space 31. In addition, the rate of air flow through the processing space is increased, by adjusting at least one of the regulating members 53, 63 as well as by lifting the rotor disc 23 and by the resulting increase of the clearance between the seat 5 and the rotor disc, so that the particles become whirled and—at least in places—fluidized to a large extent, as much as possible. After the the produced granulated particles have been dried, the rotor disc 23 is lowered again into its lowest end position, the lowest part of the vessel containing the batch of produced granulated particles is separated from the remaining part of the vessel and emptied, subsequent to which a new batch of the particulate material to be granulated may be introduced into the vessel and processed therein.

Now that the general sequence of the production of granulated or agglomerated particles has been described, there follows the detailed account of the results of the investigations relative to the course of the granulation or agglomeration operation and its control. Experiments have been carried out with various particulate materials, with and without the addition of a bonding medium.

In a first group of experiments the agglomeration was done by adding a bonding medium, polyvinyl-pyrollidine, abbreviated as PVP, was used for example as bonding medium. In various experiments the PVP was admixed as solid particulate material to be agglomerated, and the moved mixture was sprayed with a liquid humidifying medium, namely with demineralized or distilled water. In other experiments the PVP was dissolved in a solvent, namely in demineralized or distilled water, and sprayed as a solution onto the moved particles to be agglomerated. The experiments have shown, that the time-dependent variation of the torque, if a bonding medium was added, was qualitatively at least essentially equal, irrespective of whether the bonding medium was added in the form of a solid, poured material, or in the form of a solution.

For the initial, dry particulate material, lactose was used, for example, and to the lactose was admixed a solid bonding medium, namely polyvinyl-pyrollidine, abbreviated as PVP, or a mixture of lactose, corn starch, and PVP, or a mixture of mannite and PVP, or a mixture of microcrystalline cellulose, as commonly available under the trade name Sanacel 90 or Emcocel, and PVP, while the proportions of bonding medium parts were also varied. For the liquid, demineralized or distilled water was sprayed each time into the processing space, specifically, constant quantities per unit of time. The rotor disc 23 was rotated each time with a constant rotational speed, within the range of 350 to 450 rotations per minute, so that with a rotor disc diameter of approximately 47 cm, there resulted peripheral speeds of the rotor disc of approximately 8.6 m/sec to 11 m/sec. The air introduced into the processing space 31 was air drawn from a room of a building or from the surroundings thereof; this air was only filtered but not conditioned in any way, i.e. neither dried, nor humidified, so that the air entering the processing space was at least approximately of the same humidity as the surrounding air. The air to be used for the agglomeration operation was introduced into the processing space either without heating, at normal room temperature of about 20° C. to 25° C., or it was heated by the gas heater, to approximately 60° C., for example. The air flow quantity or rate was set at the beginning of an agglomeration operation to a predetermined value, and was held at this value till at least approximately the end of a relatively short, humidifying phase, defined in more detail in the following. The phase of the agglomeration operation following the humidifying phase was carried out either at the same rate of air flow, or at an increased rate of air flow. For the drying operation the air flow rate was normally (once more) increased, as was mentioned before. In other respects, the rate of air flow was so adjusted, that the particulate material was sufficiently moved during all phases of the process and more or less whirled, when required, as well as fluidized, without being blown into the filter 39 or 139.

In the course of the investigations conducted, the torque D required for the rotation of the rotor disc 23, and proportional to the power consumed by the latter, was continuously determined during the agglomeration operation and plotted as a curve in dependence of the time t, for example recorded directly by means of a recorder. The investigations indicated, that the resulting curves are different for different raw materials and may vary from batch to batch even for the same raw material, but that they are, nevertheless, qualitatively similar, and possess certain common features that appear in conjunction with all of the raw materials used. The course of an agglomeration operation, and in particular the time dependent variation of the torque is, in general, at least in qualitative respects, independent upon whether the inlet member possibly required for a particulate material, and the spraying device, are built in accordance with FIG. 1 or in accordance with FIG. 2, or upon the number of nozzles, which the spraying device 35 or 135 might have. When using the system shown in FIG. 2 for operations in which subsequent to introducing a batch of particulate material into the processing space 31 no additional particulate material was to be introduced into said processing space before completing the processing of this batch, then the particle guide piece 133b was each time previously removed and the connection 133a closed-off.

The granulation of an initial particulate material comprising 98% by weight lactose—150 mesh—and 2% by weight polyvinyl-pyrollidine, abbreviated PVP, will now be explained in more detail, as an example. The agglomeration was carried out using a constant rate of sprayed liquid of 0.025 ml liquid per minute and per gram of the initial dry particulate material. The rate of air flow was increased approximately two minutes after the beginning of the spraying operation, namely approximately at the end of the phase of humidification, then held constant during the remainder of the agglomeration operation and increased during the beginning phase of the drying operation.

Figure 4:
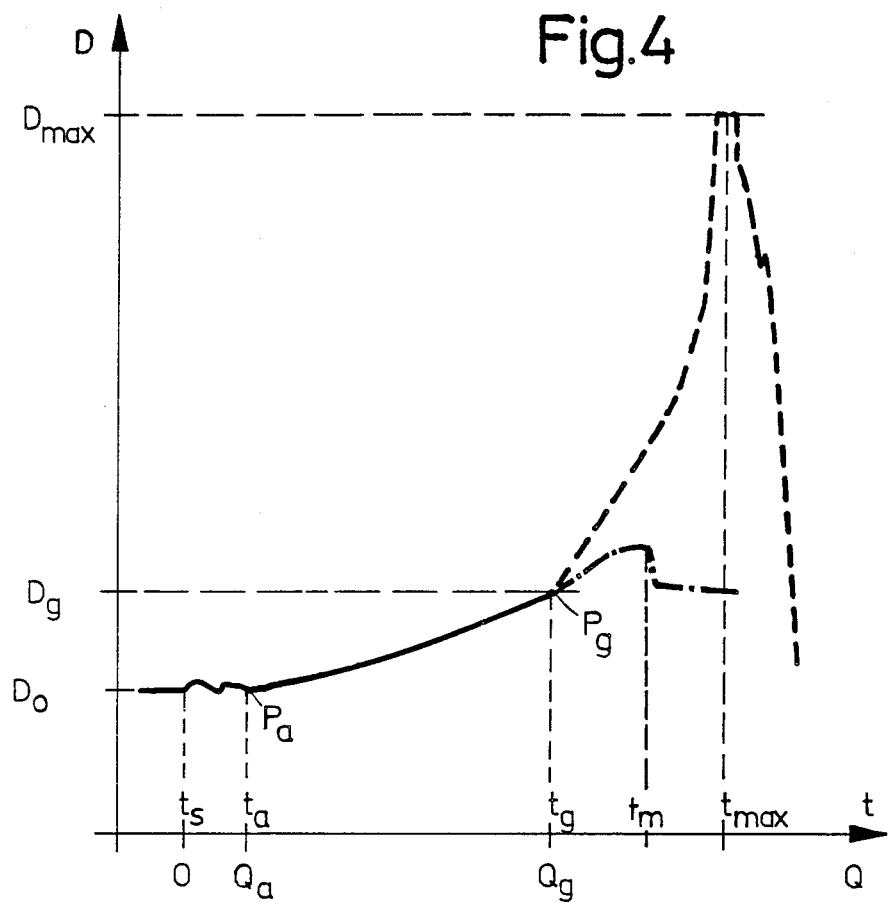

The time dependent variation of the torque D as taking place in an experiment of this kind is shown in FIG. 4. If, at the beginning, the rotor disc 23 is first rotated and air is conveyed through the processing space 31, but liquid is not yet sprayed into the processing space, then the torque required for overcoming the friction losses in the bearings and the transmission losses in the bevel gear train of the bearing and transmission unit 15, and for moving the dry material present on the rotor disc, disregarding any possible small fluctuations, has the value $D_o$. At the time $t_s$ the liquid is started to get sprayed into the processing space. The abscissa carries, in addition to the time t, the quantity of the sprayed liquid Q par unit of mass of the dry particulate material, which, beginning with the time $t_s$, is proportional to the time difference $(t-t_s)$ Subsequent to breaking off the liquid supply, the actual quantity of liquid Q of course does not increase any further, which in FIG. 4 and, moreover in the FIG. 5 described further down, is indicated by the curve portions drawn in dashed or dashdotted lines. Up to the time value $t_a$, which the liquid quantity $Q_a$ and the point $P_a$ on the curve are associated with, the torque still remains nearly equal to the value $D_o$, disregarding any small fluctuations, or increases perhaps slightly. The time interval extending from $t_s$ to $t_a$ constitutes the formerly mentioned humidification phase, during which the particles are humidified, without any agglomeration worth mentioning taking place. At the time $t_a$ the particles begin to agglomerate and the torque increases with a slope at least approximately constant, or slightly increasing, up to a time $t_g$ having its associated quantity of liquid $Q_g$, and attains there, at the point $P_g$ of the curve, the value $D_g$. In the initial portion of the process phase extending from $t_a$ to $t_g$, it is the particles of the initially provided, particulate material that first become attached to larger particles; on these particles then, at least predominantly, additional particles become deposited, such as were already present in the initial material. Particularly in the final portion extending to the time $t_g$ of the formerly mentioned process phase lying between $t_a$ and $t_g$, the agglomeration takes place in such a way, that practically no previously agglomerated particles become mutually connected; instead, only particles initially present in the particulate material will become deposited onto already agglomerated, larger particles, this deposition taking place each time with relative symmetry with respect to the center of a particle already agglomerated, with the result, that the agglomerated particles become uniformly larger and assume rather uniform sizes, as well as roundly, ball-like shapes. At the poit $P_g$ of the curve and in its close vicinity, the agglomerated particles show, in addition, a liquid content suited for the formation of granulated material, and which is suited to yield a good bond and good strength properties associated therewith. If, after the time $t_g$ liquid is continued to be sprayed, then the corresponding variation of the torque is represented by the dashed portion of the curve. In this case, the curve displays a break at the curve point $P_g$ and the slope becomes suddenly steeper, until the torque reaches at the time $t_{max}$ its maximum value $D_{max}$. During the phase between the time values $t_g$ and $t_{max}$, it is the particles already agglomerated that increasingly become mutually connected. Therefore, in this phase there takes place an agglomeration, which yields rapidly increasing particles and with considerable differences between them in their rate of growth, whereby the agglomerated particles take up more liquid than they need for bonding with the particles of the initial material contained in them, and become therefore over-humidified. Then, at the time $t_{max}$, the empty spaces between the agglomerated particles present on the rotor disc will be more or less filled with liquid. If still more liquid is sprayed, then the torque will fall off steeply, this being caused by the fact, that the particles present on the rotor disc will now become suspended in the liquid.

Let the time value, at which the agglomeration operation, i.e. the spraying of liquid is ended, be identified by $t_e$ and let the quantity of liquid per unit of mass of the dry, particulate material sprayed up to the time $t_e$ be identified by $Q_e$. If the time value $t_e$ coincides with the time value $t_g$, then, as mentioned before, the formed granulated particles will possess good bonding and resistance properties. This is also true for the curve points in the vicinity of $P_g$, i.e. for the curve points lying in front of or after $P_g$. The total quantities of liquid sprayed per unit mass of dry material, as corresponding to these points on the curve, should deviate—if a bonding medium is used—by not more than 20%, and for example by not more than 10%, from the liquid quantity $Q_g$. The same applies to the deviations of the time durations $(t_e-tt_s)$ from the time durations $(t_g-t_s)$. The ending of the agglomeration operation at the curve point $P_g$ or within the aforementioned close vicinity thereof, will have the result, that the granulated particles will have ball-like shapes as well as size distributions lying within comparatively narrow limits, and sizes that lie within the range of, for example, 0.25 mm to 2 mm, convenient for pharmaceutical applications requiring the production of granulated particles to be filled into capsules, or even sizes lying within the particularly advantageous range between 0.5 and 1 mm.

The particle size may, of course, be influenced by the time value $t_e$, at which the agglomeration is ended. During the experiments, the range of particle sizes was determined, among others, for varying ratios of $Q_e/Q_g$, by sifting the granulated particles produced. Results showed, for example, that using a ratio $Q_e/Q_g=0.9$, about 91% by weight of the granulated particles were in a size range between 0.25 and 0.5mm, whereas using a ratio $Q_e/Q_g=1.08$, approximately 89% by weight of the particles were in a size range between 0.71 and 1.4 mm.

If the liquid supply is ended at the time $t_g$ and the drying operation begins, then the torque displays from this time on the variation shown in FIG. 4 by the dash-dotted portion of the curve, whereby the quantity of liquid Q, as mentioned before, fails to increase any further. Subsequent to ending the liquid supply, the torque keeps mounting slightly; this probably comes about as a result of the fact, that the liquid contained inside the particles reaches their outer surface owing to the centrifugal forces and to diffusion phenomena, and further increases the adhesive effect of said particles slightly. Subsequent to this increase, the curve displays a "flat" maximum and then falls off. If for accelerating the drying operation the rate of air flow is increased at the time $t_m$, then the torque falls off, steeply at first, and then again slowly, until it reaches approximately the value $D_o$ again after completed drying; this is not visible in FIG. 4 anymore.

The time values $t_a$ and $t_g$, and the corresponding liquid quantities $Q_a$ and $Q_g$, respectively, are however dependent upon the temperature and the humidity of the air entering the processing space, upon the specific surface area and thus upon the particle size of the initial, dry, particulate material and upon the rate of air flow therethrough. The experiments carried out with lactose resulted in humidifying time values $(t_a-t_s)$ lying in the order of magnitude of 2 minutes, whereas the time durations $(t_g-t_s)$ were in the range of 7 to 10 minutes. When the weather was good, for example, the values of $Q_g$ and $t_g$ were 0.24 ml/g and 9.6 minutes, respectively, whereas in rainy weather the corresponding values were 0.185 ml/g and 7.4 minutes, respectively, $Q_g$ being specified in accordance with the definition of Q as liquid volume per unit of mass of the dry particulate material.

In the experiments using mannite, liquid spray rates of 0.025 ml/min g equal to those employed in the experiments with lactose were used, and similar values also resulted for $t_a$ and $t_g$. Microcrystalline cellulose (Sanacel 90) requires larger quantities of liquid than lactose and mannite for agglomeration. Therefore, a larger liquid spray rate was used in the experiments with cellulose, specifically 0.07 ml/min g. The resulting values for the humidification phase, i.e. for $(t_a-t_s)$ were of a magnitude of 8 minutes, and for $(t_g-t_s)$ of a magnitude of 30 minutes. When mannite and microcrystalline cellulose were granulated, there again resulted, in the vicinity of $t_g$, granulated materials having advantageous bonding and resistance properties, and convenient particle sizes and size distributions.

If a granulated material is to be produced from a certain particulate raw material, said granulated material to have particles with specific predetermined properties, which may be associated with a particular point on the curve, then provision may be made to terminate the agglomeration operation at this point of the curve. Since, however, the curve shapes and in particular the time durations $(t_g-t_s)$ may vary from batch to batch, the desired properties of the granulated particles cannot be produced by prescribing for the time duration $(t_e-t_s)$ to have a constant value. However, the time value $t_e$ and the time difference $(t_e-t_s)$ may be set for example in accordance with the following variants of the method:

Variant A

During the agglomeration operation the derivative dD/dt, i.e. the first derivative of the torque with respect to time is continuously determined, or the derivative dD/dQ proportional thereto, i.e. the first derivative of the torque with respect to the quantity of liquid sprayed, per unit of mass of dry material. This makes it possible to determine the time at which this first derivative, which during the humidification phase is approximately zero, assumes a positive value and at which the torque begins to increase. This time value may now be associated with the time $t_a$. If the time $t_a$ can be determined in this way with sufficient accuracy, then the time difference $(t_a-t_s)$ will provide a measure for setting the time difference $(t_e-t_s)$, i.e. the latter time difference may then be made equal to a product $k(t_a-t_s)$, in which k is a constant factor, that may be experimentally determined. However, the fluctuations of the instantaneous values of the torque D result in the fact, that the time $t_a$ can often be determined with a relatively large inaccuracy only, so that this procedure for setting the time $t_e$ is frequently, at least if taken by itself, not sufficiently accurate.

Variant B

A threshold value $D_e$ is set for the torque, and the spraying is ended as soon as the torque has reached the threshold value $D_e$; the time $t_e$ is thus established. This variant is based upon the recognition, that when processing several batches of the same material, in general, $D_g$ varies less from one batch to the other, than $t_g$ does.

Variant C

In a manner identical to that used in variant A, the derivative dD/dt or dD/dQ is continuously determined. The time $t_g$ and the value D of the torque may be so recognized, that the slope of the curve and the derivative suddenly change from one positive value, to a second, larger positive value. Since in actual practice, between $t_a$ and $t_g$ the torque varies, in general, with less smoothness than is shown on the curve, but, instead, it fluctuates slightly around the idealized curve, it is necessary, when determining the derivatives, to average out the measured values of D over a certain time interval. Thus, when actually carrying out an agglomeration operation, the accurate location of the sudden increase of the derivative can only be determined at a point in time, that lies slightly past the time $t_g$. As was mentioned before, in the vicinity of $t_g$ it is possible to obtain granulated materials having sizes suited for pharmaceutical applications. Steps may therefore be taken, to end the agglomeration operation at a time slightly past the time $t_g$, in which the sudden increase of the derivative is detected. If, on the other hand, the aimed-at properties of the granulated material correspond to a point in time $t_e$ that lies past the time $t_g$ and past the time at which the sudden increase of the derivative is detected, then a certain quantity of fluid may be continued to be sprayed after the detection of the sudden increase, for a certain time duration. This additional duration of spraying time and the additional quantity of fluid may be rigidly prescribed or may be made, for example, proportional to the time duration $(t_g-t_s)$ by a factor of proportionality.

Another possibility consists in supplying liquid past the time $t_g$, until the time at which the torque has increased beyond the value $D_g$, for example by an accurately predetermined value.

If the agglomeration carried out in accordance with variant C is desired to be terminated at a time $t_e$ lying before $t_g$, then there exists in principle the possibility to introduce, subsequent to the detection of the sudden increase of the derivative, an additional quantity of particulate material accurately predetermined, or calculated on the basis of the time duration ($t_g - t_s$), through the inlet member 33 into the whirling chamber 31, by means of the supply device 91. In this way the momentary value of Q becomes reduced, and the coupling between t and Q changed. If one assumes the Q-scale as fixed, then the time scale will become stretched, with the effect, that in certain respects one jumps back on the curve, to a point lying before $t_g$. Subsequent to this jump, liquid may be sprayed for a certain additional time, to get to the point on the curve preset for the termination of the agglomeration operation. In this regard it should be pointed out, to be sure, that not all of the properties of the agglomerated particles will participate in such a "backward time jump"; consequently, if the agglomeration operation is terminated after a jump of this kind, at a time $t_e$ fictitiously lying on the curve before the time $t_g$, then the particles will not have the same properties as they would, if the point in question would be reached on the curve without said "backward time jump".

A group of experiments was also carried out, in which a particulate material comprising particles of microcrystalline cellulose was agglomerated without the addition of a solid or liquid bonding medium, whereby demineralized or distilled water was sprayed as humidifiying agent into the processing space.

Figure 5:
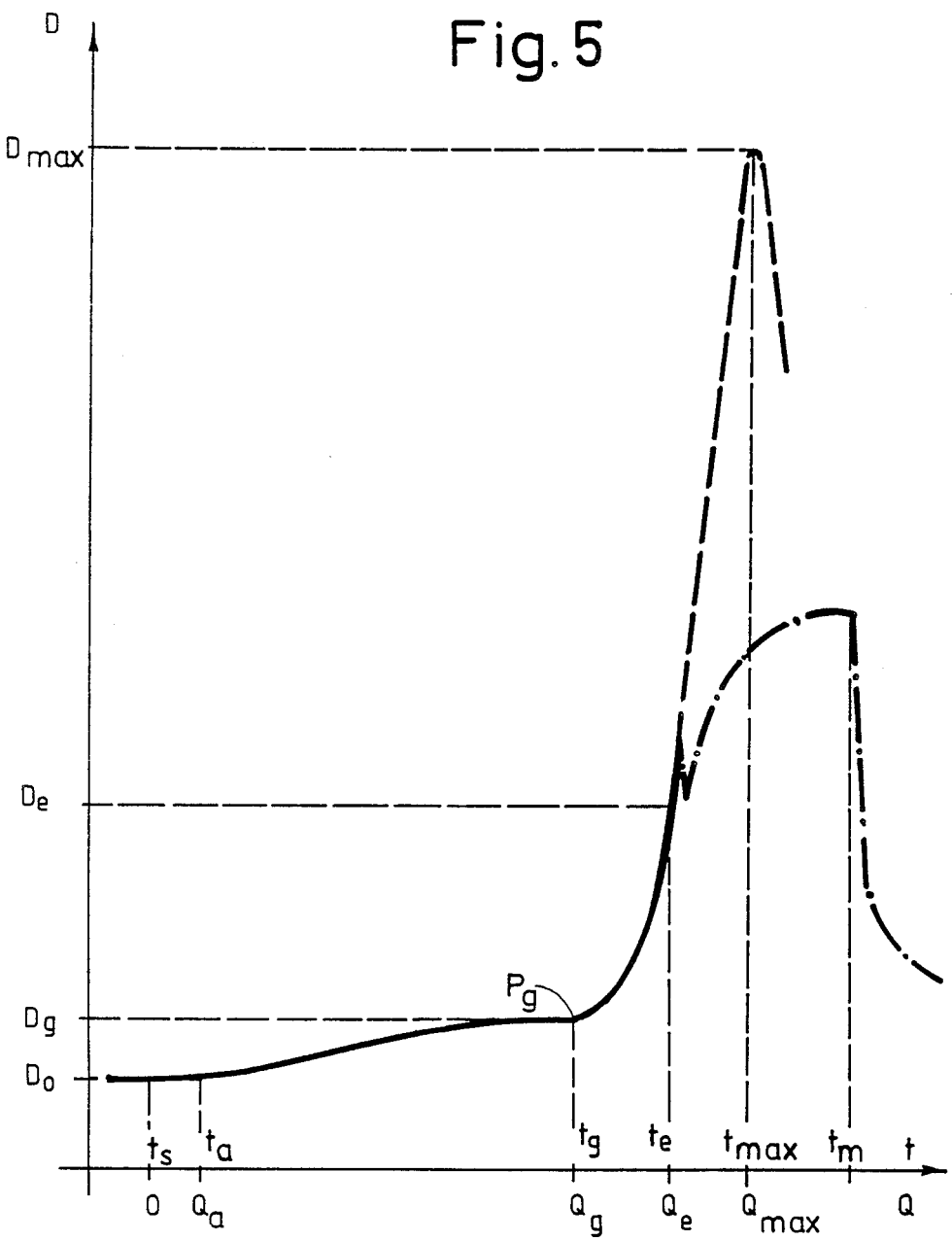

In FIG. 5 is shown as an example for an agglomeration operation carried out without any bonding medium, the time-dependent variation of the torque for the agglomeration of a particulate material consisting of microcrystalline cellulose commercially obtainable under the trade name Emcocel. Demineralized water as humidifiying agent was sprayed into the processing space during whirling. The drawn curve was determined using a system corresponding essentially to that of FIG. 2, whereby, however, the particle guide piece 133b was removed and the connecting piece 133a of the inlet member 133, serving for introducing a particulate material, was closed off; furthermore, the spraying device 135 was provided with a single nozzle 135a.

In the diagram drawn in FIG. 4 the symbols t, Q and D refer to the same variables as in the diagram according to FIG. 4. Furthermore, the values of the variables indicated with subscripts, as well as the point $P_g$ on the curve, have—at least in regard to the time-dependent variation of the torque—the same meaning as in FIG. 4. At the time $t_s$ begins the spraying of the liquid humidifying medium. The torque D then increases slowly between the time values $t_a$ and $t_g$, whereby the section of the curve extending between the time values $t_a$ and $t_g$ is slightly s-shaped, so that the slope in the last partial portion located immediately before the time $t_g$ has, at least approximately, the value zero. If liquid is sprayed into the processing space past the time $t_g$, then the torque will steeply increase, as in FIG. 4. In the operation shown in FIG. 5, and carried out without the addition of a bonding medium, an agglomeration of the initially provided particles takes place, at least probably, between the time values $t_a$ and $t_g$, in the same way, as if a bonding medium were used. If the supply of liquid is terminated before the time $t_g$, then the bonds between the possibly agglomerated particles will be, however, weak enough, to become loose again during the subsequent drying operation, so that at the end of the drying operation the particulate material will again be present in the original non-agglomerated form. Therefore, if a remaining agglomeration is to take place in an operation carried out with no bonding medium, liquid must continued to be sprayed past the time $t_g$.

If the spraying operation is terminated at the time identified in FIG. 5 by $t_e$, then the quantity of liquid has reached the value $Q_e$, and remains constant thereafter. The torque increases during the drying operation, i.e. after the termination of the supply of liquid, as shown by the dashdotted part of the curve, at first with an approximately constant slope of the curve, a little longer, than it is transiently falls off somewhat, and increases subsequently with decreasing slope to a maximum. If at the time $t_m$ the rate of air flow is increased for accelerating the drying operation, then the torque decreases, at first steeply, then slowly.

If, on the other hand, liquid will be continued to be sprayed into the processing space past the time $t_e$, then the torque would keep increasing steeply in accordance with the part of the curve drawn in dashed lines, and would reach a maximum at the time $t_{max}$, as in FIG. 4.

The liquid supply may be terminated for example at a time $t_e$, which fulfills one, or perhaps at least one, of the criteria specified before in conjunction with the processes described in the variants A, B, C. Among these, it is primarily the process described as variant B, which is of advantage; in this variant, a fixed threshold value $D_e$ is prescribed for the torque, which value may be determined in a small number of experiments. Instead, the time $t_g$ could be determined, in a way previously described in conjunction with the variant C of the method, and liquid may then be continued to be sprayed during an additional time duration, for example fixedly prescribed, or up to a time value at which the torque becomes equal to the sum of $D_g$ and a fixedly prescribed difference value.

If the agglomeration is carried out by the use of a bonding medium, then the agglomerated particles will have, as previously specified, particularly advantageous properties, if $Q_e$ deviates from $Q_g$ by at most 20% and, by preference, by at most 10%. However, if agglomerating without the use of a bonding medium, the allowable deviation is larger, and $Q_e$ may be larger by up to 30% than $Q_g$, for example. However, the situation may arise in this case, that particles already agglomerated may become joined with each other to form even larger particles. However, since the rotor disc exerts a forming and even slightly compressing effect on the agglomerated particles, it is possible, in this case too, to produce at least nearly ball-shaped, as well as in other respects too qualitatively good agglomerated particles, if $t_e$ is conveniently prescribed.

If granulated particles to be used for example for pharmaceutical applications are to be produced in a system according to FIGS. 1 or 2, then the process may be manually and/or automatically controlled and/or regulated, by means of electronic monitoring, controlling and/or regulating device 95. If a granulation process is started manually or automatically, then the blower 41, the motor 81 and—immediately or with a certain delay—the supply device 93 for supplying the liquid, will be put into their operational states. Furthermore, the rate of flow regulating member 53 and/or 63 may be, for example, manually or automatically controlled and adjusted by means of the device 95 in such a way, to provide a quantity or rate of air flow through the processing space 31 as prescribed for the particular phase of the process. From then on, the device 95 will continuously process the electrical measuring signals supplied to it by the torque measuring member 75, it will form, for example, the derivative dD/dt and/or dD/dQ to, and record the timedependent variation of the torque D and/or of said derivative, on a recording device or on a screen. The measured values of D and/or the values of the formed derivatives are averaged over certain time intervals while processed in the device 95, to compensate, at least to a certain extent, for any fluctuations of the torque occurring during operation. While doing this, the last mentioned time intervals should be shorter than the time intervals $(t_a-t_s)$ and $(t_g-t_s)$.

The device 95 determines the time value $t_a$, based on the change of the derivative dD/dt or dD/dQ from zero to a positive value, and stores the time duration $(t_a-t_s)$. Furthermore, the device 95 changes, at least approximately at the time $t_a$, the setting of the regulating member 53 and/or 63, by preference automatically, so that the previously mentioned change in the quantity of air flow will become effective. The change in air flow may take place, for example at that point in time, at which the time $t_a$ was determined on the basis of the change of the derivative, and which time will lie, because of the required averaging operation, slightly behind $t_a$. It is possible, however, to have the time duration to elapse between the starting time $t_s$ and the change of the quantity of air flow, set to a prescribed, fixed value.

The monitoring, controlling and/or regulating device 95 primarily also serves the purpose, to set the termination of the agglomeration operation, while drawing upon at least one of the previously described method variants A, B, C, in such a way, that the formed granulated particles will have prescribed properties, as accurately as possible. The point in time $t_e$, at which the agglomeration is terminated, may be set manually or automatically, whereby manually controlled and automatically occurring operations may be combined with each other. At the same time it depends upon which of the variants A, B, C is or are used, whether the agglomeration operation is to be terminated exactly at the time $t_g$, i.e. at the point $P_g$ of the curve, or before or after the same. It depends furthermore upon the fact, whether or not certain ones of the parameters have become known from the processing of previous batches. If no parameters and properties of the curve are known, then the time $t_e$ may be determined, for example, during the processing of the first batch by way of manual control, whereby the person controlling the process can make his decisions on the basis of a curve drawn by a unit of the device 95 and representing the time-dependent variation of D and/or dD/dt and/or dD/dQ, and/or on the basis of numerical values indicated or printed out by other units of the device 95, or on the basis of examinations performed on samples of granulated particles removed from the vessel 1 or 101 during the agglomeration operation in progress. As soon as the approximate variation of the curve representing the time dependence of the torque, and other parameters, are known, then the device 95 may be switched to a mode of operation at least largely automatic, or completely so.

If the agglomeration operation is to end at a time $t_e$ lying before the time $t_g$, then the device 95 may set the time duration $(t_e-t_g)$ for example in accordance with the variant A, by setting said time duration to be equal to a product $k(t_a-t_s)$, the constant k having been determined before and entered into the device. Upon reaching the time $t_e$ calculated in this way, the device 95 will become effective to control the supply device 93 so, that the supply of liquid will be broken off. As an alternative, the device 95 may continuously compare the momentary values of the torque D averaged out in accordance with the variant B, with a previously entered threshold value, and terminate the supply of liquid as soon as the torque becomes equal to the threshold value. The two methods, furthermore, can be combined with each other in various ways. The device could, for example, continue the spraying after the first appearance of the value $t_e$, as determined in accordance with the variant A or with the variant B, for a certain length of time calculated on the basis of predetermined criteria, so that to some extent an averaging of the time durations $(t_e-t_s)$ of the variants A and B would take place. It is also possible, even if the agglomeration is to be terminated before the time $t_g$, or before the quantity $Q_g$ of liquid per unit of mass of dry material, to preset the time value $t_e$ in accordance with the variant C. According to this operational variant, the device 95 would then transiently put the supply device 91 in operation at the time $t_g$ or, more accurately, at the time at which it has determined the location of $t_g$ on the basis of the sudden increase of the derivative, with the result, that the supply device 91 will introduce into the whirling chamber 31 a fixedly prescribed quantity of dry, particulate material, or a quantity of said material, calculated from certain parameters determined in the course of the process in progress. The device 95 would then, furthermore, terminate the spraying operation after an additional time duration, fixedly prescribed or calculated from parameters determined during the process.

If the envisaged time $t_e$ lies at the time $t_g$ or shortly thereafter, then $t_e$ may similarly be determined in accordance with the variant A or B, or from a combination of these two variants. However, in this case, the most accurate results will be obtained, in general, if the device will set the time $t_e$ in accordance with the variant C.

In actual practice it is possible to determine the method of control, which for a particular product will yield the best product quality, by experiments, and by continuously controlling the granulated particles produced.

The liquid could also be supplied—during the agglomeration operation—intermittently, rather than continuously. Furthermore, the rate of liquid supply could be changed in the course of an agglomeration operation in a specific manner, in which case, of course, the supply device 93 would have to be equipped with a metering member. It these variants were used, it would be, of course, necessary to correspondingly adapt the method of controlling the agglomeration process. In such a case, it could be of particular advantage to use the derivative dD/dQ instead of dD/dt for this control.

In the course of the agglomeration operation the humidity measuring member 87 comes in contact with the particles present on the rotating rotor disc 23 and possibly with particles of the particulate material flying about freely within the processing space, it is effective to measure the humidity of these particles and to provide the electronic device 95 with electrical signals, these signals representing a measure for the superficial and total humidity, i.e. for the water content of the particles. The rolling movement of the particles present on the rotor disc contributes to preventing the particles from adhering to the measuring member 87. The humidity values measured by the measuring member 87, as well as the changes of these values, may be used by the electronic device 95 and/or by a person, as additional informations for associating the momentary condition of the particles with a particular point on the curves shown in FIGS. 4 and 5, and for controlling the course of the process.

As has been explained before, the systems may also be used for providing particles newly introduced into the processing space 31 or previously produced therein by agglomeration, with at least one coat. For this purpose, it is possible, for example, to introduce into the processing space in addition to the first particles intended to be coated, a powder consisting of smaller, second particles, to be applied onto said first particles, furthermore, to move the mixture of particles by the rotation of the rotor disc 23 as well as by whirling it by means of an air stream, and to spray a liquid, that normally contains or forms a bonding medium. The second particles may be introduced into the processing space through the inlet member 33 or 133. In this case, if the system shown in FIG. 2 is used, then the particle guide piece 133$b$ is left, of course, in its mounted condition in the processing space.

The coating operation is governed by similar principles as were previously explained in conjunction with the agglomeration operation. As a matter of fact, in a phase of operation that corresponds to the part of the curve of FIG. 4 lying between the curve points $P_a$ and $P_g$, there occurs a deposition of the smaller particles—intended to serve as coating material—onto the larger particles intended to be coated, while the latter do not become mutually joined. If, on the other hand, the point $P_g$ would be significantly passed beyond, then the undesirable agglomeration of the particles to be coated and of those already coated, would begin. It is therefore of advantage, when coating particles, to make sure that the point corresponding to the curve point $P_g$ be not passed beyond, or at least not significantly so, when approaching the point on the curve from the left.

The coating operation progresses, at least in certain cases, particularly efficiently and uniformly, if the operational parameters and conditions correspond to a state lying slightly in front of the point $P_g$ on the curve. Therefore, the operation for coating particles for example, may be carried out by spraying liquid, subsequent to the initial introduction of a certain quantity of the particles to serve as coating material, until the curve point $P_g$ is at least approximately reached, or slightly passed beyond. At this point in time corresponding approximately to the time $t_g$, the spraying of liquid may be transiently interrupted and a certain quantity of new particulate coating material may be introduced into the processing space through the inlet member 33 or 133. By the introduction of new coating material, there arise conditions that correspond to a state lying to the left of the point $P_g$, similar to the state previously described with reference to the agglomeration process in conjunction with the variant C. If, subsequent to introducing new particulate coating material, additional liquid is sprayed, this corresponds, in the in the diagram corresponding to FIG. 4, to a movement to the right along the curve, toward the point $P_g$. As soon as this point has been reached, new coating material may again be introduced or the coating operation may be terminated. It is thus possible to alternatingly spray liquid into the processing space and introduce solid coating material into the same. In this way it is possible to apply at least a significant part of the coating material onto the particles to be coated, by oscillating, as it were, back and forth within a range of states lying in the vicinity of the curve point $P_g$, while the control is done in the same way as that used in conjunction with the agglomeration operation, namely, on the basis of torque measurement and possibly by also using the humidity measurement.

If the coating operation is to be carried out in a state corresponding to another point on the curve, then the latter may be characterized by associating therewith a value of the torque or a time-dependent change of the torque. It is then possible, in analogous manner, to oscillate back and forth within a range of states lying in the vicinity of said predetermined curve point, as has been explained before in conjunction with the point $P_g$.

The coating operation could perhaps be modified, by providing that additional liquid be sprayed during the time interval in which new particulate coating material is introduced into the processing space. Thus, in a variant of this kind, particulate coating material would be intermittently introduced into the processing space, while continuously spraying liquid, until such time as the liquid spraying is terminated. Provisions could possibly be made, furthermore, to continuously introduce liquid as well as particulate coating material into the processing space, and to control the ratio between the rates supplied, on the basis of measured torque values and possibly of humidity values. The possibility could also exist, to suspend the particulate coating material within a liquid and to spray this suspension into the processing space. With this variant of of the coating operation it would be possible to determine the sprayed quantity of suspension, for example on the basis of the measured values of torque, and/or it would also be possible to meter the content of solid particles of the suspension so, that one part of the coating operation would be carried out under conditions corresponding to a state lying in the vicinity of a predetermined point on the curve, such as of the point $P_g$ on the curve.

Of course, the application of coats onto the particles and the drying operation normally following thereafter can also be controlled and/or regulated, manually or automatically, by means of the monitoring, controlling and/or regulating device 95. At the same time the device 95 could, for example, switch the gas heater on and off and possibly regulate it on the basis of an air temperature measurement. Of course, the blower 41 and the motor 81 can be put—by the device 95—out of operation at the proper time, for example, at the end of processing a batch, manually or automatically.

In lieu of the humidity measuring member 87 or in addition to the same, there could be provided an additional humidity measuring member disposed further up in the processing space and arranged to not come in contact anymore with the particles present on the rotor disc. Furthermore, a humidity measuring member could be provided high enough in the processing space or in the air exhaust conduit leading out from the same, which would have no contact at all with the particles. The measuring member would then measure the humidity of the exhaust air, which is related to the humidity of the particles, so that the measured values would also supply a measure for the humidity of the particles.

Furthermore, one of the two flow-regulating members 53, 63 could be dispensed with, and/or the conduits 51 and 61 could be mutually connected, so that they would constitute—together with the vessel 1 or 101—a closed circuit.

Furthermore, another gas, rather than air, may be passed through the processing space. Also, the agglomeration operation itself may take place without having any gas passed through the processing space, with the result, that the movement of the particles during agglomeration would-be effected exclusively by the rotor disc and by the deflection of the particles on the vessel wall. During the drying operation following the agglomeration operation, gas may then be passed through the processing space and through the particles present in the processing space, as done in the method variants previously described.

We claim:

1. Method for agglomerating particles and/or coating particles with other particles, wherein particles are introduced into a processing space of a vessel, there processing space being limited at its lower end by a rotor disc rotatable around a vertical axis, wherein in an agglomeration and/or coating operation the rotor disc is rotated and gas is passed in an upward direction through the processing space so that particles to be agglomerated and/or coated are moved in such a way that they are alternately rolled over the rotating rotor disc and lifted up by the gas and wherein a liquid is sprayed at least intermittently onto the moved particles, wherein a variable related to the torque required for rotating the rotor disc is measured at least during the agglomeration and/or coating operation and wherein the spraying of liquid is terminated at a time at which said variable reaches a preset threshold value, and wherein the particles—after the spraying of liquid has been terminated—are dried in the processing space.

2. Method as claimed in claim 1, wherein the rotor disc is rotated by a drive device, wherein said variable is the torque itself and wherein, the torque measured between the drive device and the rotor disc by means of a torque measuring adapted member for producing an electric measuring signal.

3. Method as claimed in claim 1, wherein said gas consists of air sucked in from the surroundings and supplied to the processing space without adjusting its humidity.

4. Method as claimed in claim 1, wherein the rotor disc is rotated with a drive device comprising a device with an electric motor and wherein the electric power consumption of the motor is measured as variable related to the torque.

5. System for agglomerating particles and/or for coating with different particles, the system comprising a vessel, a rotor disc rotatably supported in said vessel around a vertical axis for moving the particles, a drive device operatively connected for rotation with the rotor disc and serving for rotating the same, a measuring member for measuring a variable related to the torque required for rotating the rotor disc, means for passing gas in an upward direction through a processing space being inside the vessel and adjacent to the upper side of the rotor disc so that particles to be agglomerated and/or coated can be moved in such a way that they are alternatingly rolling over the rotating disc and lifted up by the gas, wherein the system is further comprising means for spraying a liquid onto the moved particles.

6. System as claimed in claim 5, characterized in that the measuring member is a torque measuring member and is built into the transmission mechanism for transmitting rotational movements from the drive device to the rotor disc.

7. System as claimed in claim 6, characterized in that the torque-measuring member is mounted within the transmission mechanism between a transmission unit for setting the rotational speed of the rotor disc, and that between the torque/measuring member and the rotor disc said transmission mechanism is free of any gearing for changing the rotational speed.

8. System as claimed in claim 7, characterized by a device connected with said measuring member and comprising electronic circuit means adapted to process measuring signals emitted by said measuring member and for transiently interrupting and/or ending the spraying of liquid in response to said signals.

9. System as claimed in one of the claim 5, characterized by at least one humidity/measuring member disposed within the processing space that accommodates the particles to be moved and processed, said humidity/measuring member being positioned fixed in relation to the wall of the vessel and set in relation to the upper boundary surface of the rotor disc at such a distance, to enable, during particle movement, the particles momentarily present on the rotor disc to come in contact with the humidity/measuring member.

10. Method as claimed in claim 2 wherein the driving device comprises a motor and a transmission unit provided with means for adjusting the rotational speed of the rotor disc and wherein the torque is measured between the output shaft and the rotor disc.

11. Method as claimed in claim 10 wherein the transmission unit enables a stepless adjustment of the rotational speed of the rotor disc.

12. Method as claimed in claim 10, wherein the torque is measured between a horizontal output shaft of said transmission unit and a horizontal input shaft of a gear train adapted for transforming rotations around a horizontal axis into rotations around the vertical axis of the rotor disc.

13. Method as claimed in claim 1, wherein the vessel comprises a seat with a conical inner surface and wherein the rotor disc is vertically adjustable and adapted to be brought from a position in which it rests tight on the seat into other positions in which there arises an annular gap between the rotor disc and the inner surface of the vessel, the width of the gap being adjustable by vertically displacing the rotor disc.

14. Method as claimed in claim 1, wherein the introduction of the particles to be agglomerated and/or coated into said processing space, the agglomerating and/or coating and the drying of the particles are made batchwise, whereby a batch of particles containing the entire amount of particles to be agglomerated and/or coated with different particles is introduced into said processing space, before the agglomeration and/or coating operation.

15. Method as claimed in claim 1, wherein the particles are coated after their agglomeration.

16. Method as claimed in claim 1, wherein the threshold value is a constant determined for obtaining a product with predetermined properties.

17. Method as claimed in claim 16, wherein the threshold value is determined in such a way that particles resulting from an agglomeration of the initial particles introduced into the vessel have a predetermined average size.

18. Method as claimed in claim 1, wherein the values of the measured variable are registered and/or displayed.

19. Method as claimed in claim 18, wherein the spraying of liquid is terminated whenever the registered and/or displayed value of the measured variable correspond to said threshold value.

20. Method as claimed in claim 1, wherein the spraying of liquid is terminated automatically by a controlling and/or regulating device whenever the value of the measured variable corresponds to said threshold value.

21. Method as claimed in claim 1 wherein—during the agglomeration and/or coating operation includes the step of spraying liquid continuously and at a constant rate onto the particles.

22. Method for agglomerating particles and/or coating particles with other particles, wherein particles are introduced into a processing space of a vessel, the processing space being limited at its lower end by a rotor disc rotatable around a vertical axis, wherein in an agglomeration and/or coating operation the rotor disc is rotated and gas is passed in upward direction through the processing space so that particles to be agglomerated and/or coated are moved in such a way that they are alternatingly rolling over the rotating rotor disc and lifted up by the gas and wherein a liquid is sprayed at least intermittently onto the moved particles, wherein a variable related to the torque required for rotating the rotor disc is measured at least during the agglomeration and/or coating operating and wherein the first derivative of the torque D and/or of the variable proportional thereto, with respect to time t and/or with respect to the sprayed quantity of liquid Q is determined, furthermore, the time $t_a$ is determined, at which the torque D, starting out from an initial value $D_o$ begins to rise, disregarding any possible fluctuations as well as the time difference ($t_a - t_s$) elapsed between the time $t_s$ corresponding to the beginning of said spraying of liquid and said time $t_a$, and independence of this time difference a further time difference ($t_e - t_s$) is prescribed, the latter time difference ($t_e - t_s$) being made equal to the product of the time difference ($t_a - t_s$) and a predetermined constant factor k and wherein the spraying of liquid is ended at the time $t_e$, and wherein the particles—after the spraying of liquid has been terminated—are dried in the processing space.

23. Method for agglomerating particles and/or coating particles with other particles, wherein particles are introduced into a processing space of a vessel, the processing space being limited at its lower end by a rotor disc rotatable around a vertical axis, wherein in an agglomeration and/or coating operating the rotor disc is rotated and gas is passed in upward direction through the processing space so that particles to be agglomerated and/or coated are moved in such a way that they are alternatingly rolling over the rotating rotor disc and lifted up by the gas and wherein a liquid is sprayed at least intermittently onto the moved particles, wherein a variable related to the torque required for rotating the rotor disc is measured at least during the agglomeration and/or coating operation and wherein the first derivative of the torque and/or of a variable proportional thereto, with respect to the time t and/or with respect to the sprayed quantity of liquid Q, is determined, as well as the time $t_g$, in which said derivative undergoes a sudden change from a positive value to a larger positive value, and a time $t_e$ is set, in dependence of the time $t_g$, and wherein the spraying of liquid is ended at the time $t_e$, and wherein the particles—after the spraying of liquid has been terminated—are dried in the processing space.

24. Method as claimed in claim 23 wherein the spraying of liquid is ended at the time t.

25. Method as claimed in claim 24 wherein the spraying of liquid is ended at a time $t_e$ lying after the time $t_g$.

26. Method as claimed in claim 24, wherein new particles to agglomerated and/or coated are added to the sprayed-on particles time t.

27. System as claimed in claim 5 wherein the vessel comprises a seat with a conical inner surface and wherein the rotor disc is vertically adjustable and adapted to be brought from a position in which it rests tight on the seat into at least one other position in which there arises an annular gap between the rotor disc and the inner surface of the vessel.

28. System as claimed in claim 7, wherein said transmission unit is adapted for adjusting the rotation speed of said rotor disc stepless.

29. System as claimed in claim 7, wherein said transmission unit has a horizontal output shaft connected with said torque measuring member and wherein the latter is connected with the rotor disc over a gear train having a horizontal input shaft connected to the torque measuring member and a vertical output shaft connected to the rotor disc.

* * * * *